United States Patent [19]

Mausner et al.

[11] Patent Number: 5,161,506
[45] Date of Patent: Nov. 10, 1992

[54] LOAD ADJUSTMENT DEVICE

[75] Inventors: Eberhard Mausner, Liederbach; Manfred Pfalzgraf, Frankfurt am Main, both of Fed. Rep. of Germany

[73] Assignee: VDO Adolf Schindling AG, Frankfurt am Main, Fed. Rep. of Germany

[21] Appl. No.: 763,521

[22] Filed: Sep. 23, 1991

[30] Foreign Application Priority Data

Oct. 1, 1990 [DE] Fed. Rep. of Germany ....... 4031003

[51] Int. Cl.$^5$ .......................... F02D 9/02; B60K 26/04; B60K 26/02
[52] U.S. Cl. .................................. 123/399; 123/361
[58] Field of Search ............... 123/339, 342, 361, 399; 180/178, 179, 197

[56] References Cited

U.S. PATENT DOCUMENTS 4,848,297 7/1989 Hickmann et al. ............. 123/399 X
4,896,640 1/1990 Pfalzgraf et al. ................ 123/361 X Primary Examiner—Tony M. Argenbright
Attorney, Agent, or Firm—Martin A. Farber

[57] ABSTRACT

A load adjustment device has a control element (9) which acts on a setting member (10). The setting member 10 determines the output of an internal combustion engine and is spring-coupled with a driver (3) which can be actuated via an accelerator pedal (1) and is furthermore moveable by means of an electric setting drive (11). A desired-value detection element (6) is associated with the driver. An actual value detection element (19) cooperates with the desired value detection element and is associated with the control element and acts on the electric setting drive. The electric setting drive is adapted to be controlled as a function of the detected values by an electronic control device (7). The control element has a first control-element part (9a) associated with the setting member and a second control-element part (9b) associated with the setting drive. An idle-path coupling element (17) permits relative mobility, limited by stop at least in one direction of control, of the control-element parts, at least over a partial adjustment range of the control element. The development of the load adjustment device permits control of the setting member from the accelerator-pedal side, independently of the setting-drive-side when the setting drive is not activated. When the setting drive is activated, a control process can be effected in at least one direction of control.

11 Claims, 4 Drawing Sheets

LOAD ADJUSTMENT DEVICE

FIELD AND BACKGROUND OF THE INVENTION

The present invention relates to a load adjustment device having a control element which acts on a setting member which determines the output of an internal combustion engine. The control element is spring-coupled with a driver which is actuatable via an accelerator pedal and is moveable furthermore by means of an electric setting drive. A desired-value detection element is associated with the driver. An actual-value detection element cooperates with the desired-value detection element, and is associated with the control element and acts on the electric setting drive, the electric setting drive being adapted to be controlled as a function of the detected values by an electronic control device.

Such a load adjustment device is known from Federal Republic of Germany 38 15 734 A1. In that device, the electric setting drive permits a control of the setting member which is independent of the driver, for instance for a regulating of idle travel, speed control, or anti-slip control. For this purpose, the electric setting drive either is continuously connected with the control element and must accordingly be moved with it even if the control takes place exclusively via the driver on the accelerator-pedal side and the setting drive is deactivated. Or, on the other hand, it can be separated from the setting member by means of a coupling.

SUMMARY OF THE INVENTION

It is an object of the present invention to develop a load adjustment device of the foregoing type in such a manner that in it, with a structurally simple development, and basically without clutch, an accelerator-pedal-side control of the setting member can take place independently of the setting-drive side with the setting drive unactivated. Also a control process can be carried out at least in one control direction with the setting drive activated.

According to the invention, the control element (9) has a first control-element part (9a) associated with the setting member (10) and a second control-element part (9b) associated with the setting drive (11). An idle-path coupling element (17) also is provided which permits relative mobility, limited by stop at least in one control direction, of the control-element parts (9a, 9b) with respect to each other over a partial adjustment range of the control element (9).

By the system of the invention, there is thus established a decoupling from the setting drive of the control-element part associated with the setting member, which is preferably developed as throttle valve. This occurs, in particular, at least via a partial adjustment range of the control element so that follow-up of the control element part associated with the setting drive is at most necessary when the control-element part associated with the setting member is to assume a position outside the predetermined partial adjustment range. Due to the development of the load adjustment device, the latter thus requires only a setting drive and a control-element part associated with it in order to regulate the setting member. The separation of setting-drive side and setting member by the two control-element parts and the idle-path coupling element makes it possible to develop the setting-drive side of the load adjustment device as a separate structural part. This with existing units designed for the accelerator-pedal-side control of the load adjustment device can be subsequently applied without complication.

In accordance with one special embodiment of the invention, the relative mobility of the control element parts (9a, 9b) is limited in the upward-control and downward-control directions of the setting member (10).

The limiting of the relative mobility is intended, in this connection, to permit a relative displacement of the control-element parts (9a, 9b) with respect to each other within an adjustment range from idle to full load.

Such a development is advantageous when the setting-drive-side control of the setting member is limited to a speed control and an anti-slip control. By the relative displacement of the control-element parts in the adjustment range from idle to full load, the setting-member-side control-element part, with the setting drive unactivated, can be moved freely upon control via the accelerator pedal to the setting-drive-side control-element part. The setting drive is activated only in the event of speed or anti-slip control, and the idle-path coupling element acts by the limiting of the relative mobility of the two control element parts exerted by it in upward control and downward control directions in accordance with the control which is desired.

The idle-path coupling element advantageously forms a part of a control-element part, particularly of the setting-drive-side control-element part, and has two stops within the path of movement of the other control-element part. Furthermore a spring which urges the setting-drive-side control-element part in idle direction, in particular a tension spring, which acts on the setting-drive side control element, should be provided. The idle-path coupling element thus guides the two control-element parts with clearance and connects them in form-locked manner.

In addition, a clutch can be provided for the idle-path coupling element between the latter and the electric setting drive. In order to be able to represent the corresponding position of the setting-drive-side control-element part, as is of importance for the setting-drive-side control of the setting member via the control electronics, the actual-value detection element should be associated with the setting-drive-side control-element part. In addition, it is advantageous also if the position of the setting-member-side control-element part can be represented by another actual-value detection element and transmitted to the electronic control device. However, it is also possible to dispense with this actual-value detection element and, instead of it, by means of an electronic evaluation, to calculate the position of the setting member from the instantaneous position of the driver, detected by the desired-value detection element, and the instantaneous position of the setting-member-side control-element part, detected by the actual-value detection element associated with said part.

In accordance with another preferred embodiment of the invention, the relative mobility of the control-element parts is limited only in the upward-control direction of the setting member. The limiting makes it possible to act via the electric setting drive in the sense of an anti-slip control on the setting-member-side control-element part, and thus on the setting member in the direction of a reduction of power. For this purpose, for instance, the idle-path coupling element can be developed as coupling with a driver, one coupling half being connected to the one control-element part and the other coupling half to the other control-element part. Therein, the relative movement of the control-element parts in the upward-control direction of the setting member is limited by form-locked engagement of the driver, connected with one coupling half in the other coupling half.

While an anti-slip control is effected by the form-locked engagement of the two coupling halves of the idle-path coupling element, speed control is possible by activation of the coupling and thus by the connecting of the two coupling halves. The transmission of force preferably takes place by frictional closure when the coupling between the two control-element parts is closed. In order that the coupling half associated with the setting drive assumes a well-defined position when the coupling is open and the setting member not activated, a spring is provided which urges this coupling half and, thus the setting-drive-side control-element part, in the full-load direction. The urging in this direction makes possible, from all operating positions, not only speed or anti-slip control, but also an idle control via the electric setting drive, in which connection, in this case, an emergency-travel spring should be provided which, upon failure of the electronic control device, of the electric setting drive or of other control parts, moves the setting member into the maximum idling position. Finally, the actual-value detection element should again be associated with the setting-drive-side control-element part, and the position of the setting-member side control-element part can be detected by a further actual-value detection element.

According to the invention, the idle-path coupling element (17) is connected to a control-element part (9b), in particular the setting-drive-side control-element part (9b), and has two stops (15, 16) in the path of movement of the other control-element part (9a). A spring which urges the setting-drive-side control-element part (9b) in the idle direction is provided, in particular, a tension spring (18) which acts on the setting-drive-side control-element part (9b).

Further according to the invention, the setting-drive-side control-element part (9b) has a clutch (14) between the setting drive (11) and the idle-path coupling element (17).

Still further by a feature of the invention, the relative mobility of the control-element parts (9a, 9b) is limited only in the upward-control direction of the setting member (10).

Further, according to the invention, the idle-path coupling element (17) is developed as coupling (22, 23) with a driver (24). Therein one coupling half (22) is connected to one control-element part (9a) and the other coupling half (23) is connected to the other control-element part (9b), and the relative movement of the control-element parts (9a, 9b) in the upward-control direction of the setting member (10 is limited by form-locked engagement of the driver (24), connected with one coupling half (23), into the other coupling half (22).

Still according to a feature of the invention, the driver (24) is connected with the setting-drive-side coupling half (23) and passes through a slot in the setting-member-side coupling half (22).

Another aspect of the invention is that a spring (25) urges the setting-drive-side coupling half (23) or the setting-drive-side control-element part (9b) in the direction of full load.

Still according to another feature, the actual-value detection element (19) is associated with the setting-drive-side control-element part (9b).

Yet further, the invention provides that another actual-value detection element (20) is associated with the setting-member-side control-element part (9a).

BRIEF DESCRIPTION OF THE DRAWING

With the above and other objects and advantages in view, the present invention will become more clearly understood in connection with the detailed description of preferred embodiments, when considered with the accompanying drawings, of which.

DESCRIPTION OF THE PREFERRED EMBODIMENTS

Figure 1:
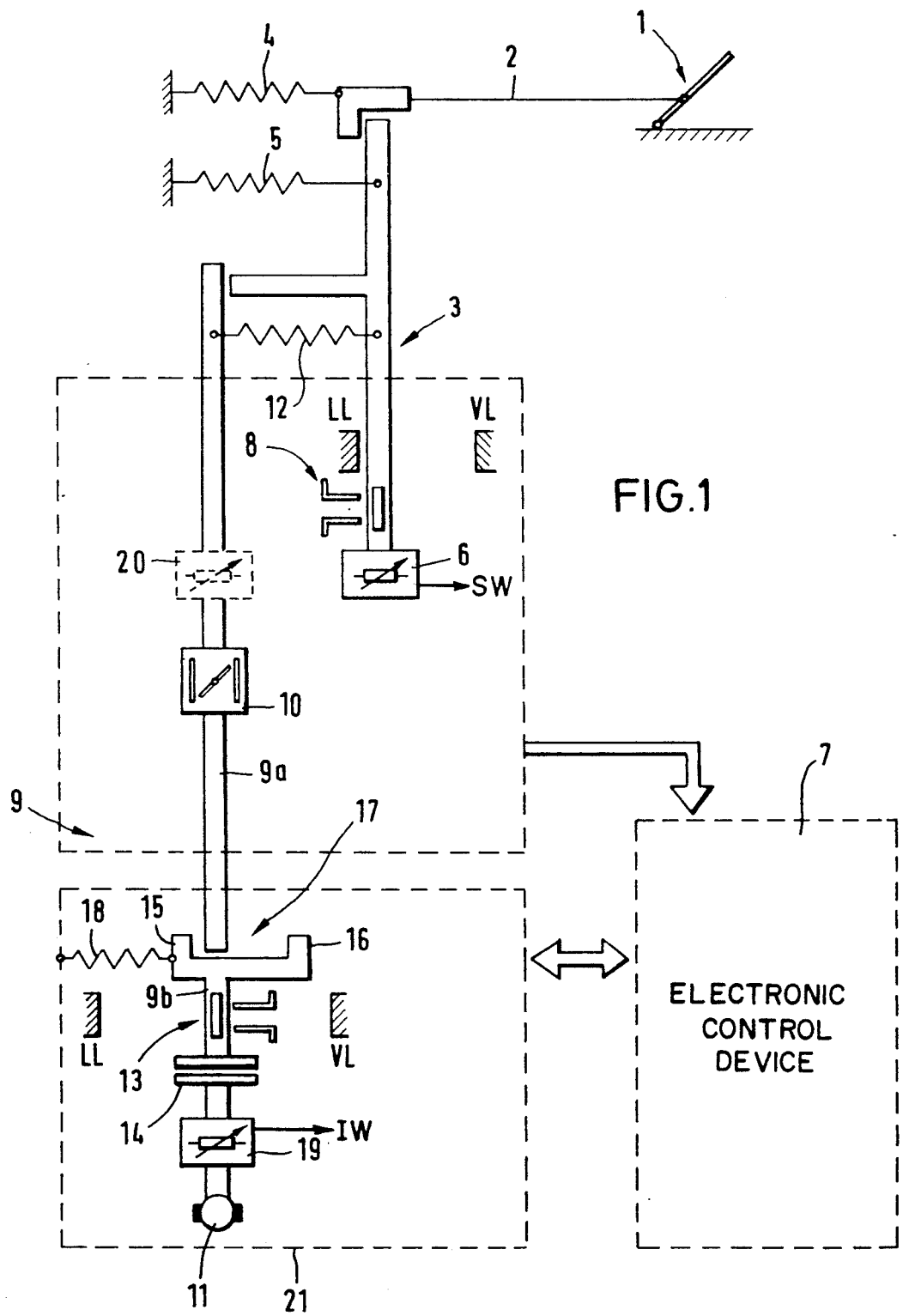
FIG. 1 shows a first basic principle of the present invention, shown on basis of a block diagram in linear showing.

FIG. 1 shows an accelerator pedal 1 by which a unipartite driver 3 can be displaced via a rod 2 between an idle stop LL and a full-load stop VL. The driver 3 and the accelerator pedal 1 are urged in idle direction by return springs 4 and 5 acting on the accelerator pedal 1. The driver 3 is connected to a desired-value detection element 6 in the nature of a wiper of a potentiometer which cooperates with an electronic control device 7. The idle position of the driver 3 is detected by a safety contact 8 which also cooperates with the electronic control device 7.

The load adjustment device furthermore has a control-element part 9 which cooperates with a setting member 10 developed as throttle valve. The control element 9 and thus the throttle valve 10 are controlled via the driver 3 and/or an electric setting drive 11.

The control element 9 consists of a setting-member-side control-element part 9a and a setting-drive-side control-element part 9b. The connection between the driver 3 and the setting-member-side control-element part 9a is effected by a coupling spring 12 which pulls the two parts towards each other. The idle position of the setting-drive-side control-element part 9b monitors another safety contact 13 which also cooperates with the electronic control device 7.

The control of the setting-drive-side control-element part 9b is effected via the electrical setting drive 11 and a clutch 14 connected behind it. The control-element part 9a is provided in the region of its end facing the setting-member-side control-element part 9a with two stops 15 and 16 between which the free end of the setting-member-side control-element part 9a is guided. The distance between the two stops 15 and 16 corresponds in this connection to the setting path of the setting-member-side control-element part 9a between LL and VL plus the dimension of this control-element part in setting direction. Thereby, the control-element part 9a can be moved via the pedal 1 from LL to VL without the setting-drive-side control-element part 9b being carried along. The region of the setting-drive-side control-element part 9b comprising the stops 15 and 16 forms an idle-path coupling element 17. The stops 15 and 16 may be referred to as first and second idle stops. A return spring 18 urges the setting-drive-side control-element part 9b in idle direction; the displacement path of this control-element part is limited by stops LL and VL and the instantaneous position of this control-element part 9b is detected by an actual-value detection element 19. For the detection of the position of the setting-member-side control-element part 9a, another actual-value detection element 20 can be provided.

In normal operation, the clutch 14 is closed. Because of the distance apart of the two stops 15 and 16 of the idle path coupling element 17, the load adjustment device can be displaced over the entire operating range LL to VL via the accelerator pedal 1 without the setting-drive-side control-element part 9b being influenced thereby. If speed regulation is to be effected, the electric setting drive is activated, whereby the setting-drive-side control-element 9b is moved in direction VL, and the stop 15 comes against the setting-member-side control-element part 9 and carries the latter along to a greater or lesser extent in direction VL corresponding to the pre-established control value. For the anti-slip control, the setting-drive-side control-element part 9b must be moved in direction LL over the idle path of the idle path coupling element 17 until the stop 16 has come against the setting-drive-side control-element part 9b; downward control of the setting member 10 is possible. FIG. 1 shows the driver 3 in the starting position LL, as well as the setting-drive-side control-element part 9b in its starting position, the parts contacting the safety contacts 8 and 13. The dashed line surrounding the setting-drive-side control-element part 9b is intended to indicate the fact that this part and the parts directly cooperating with it, particularly the electric setting drive 11 and the actual-value detection element 19, form a structural unit 21.

Figure 2:
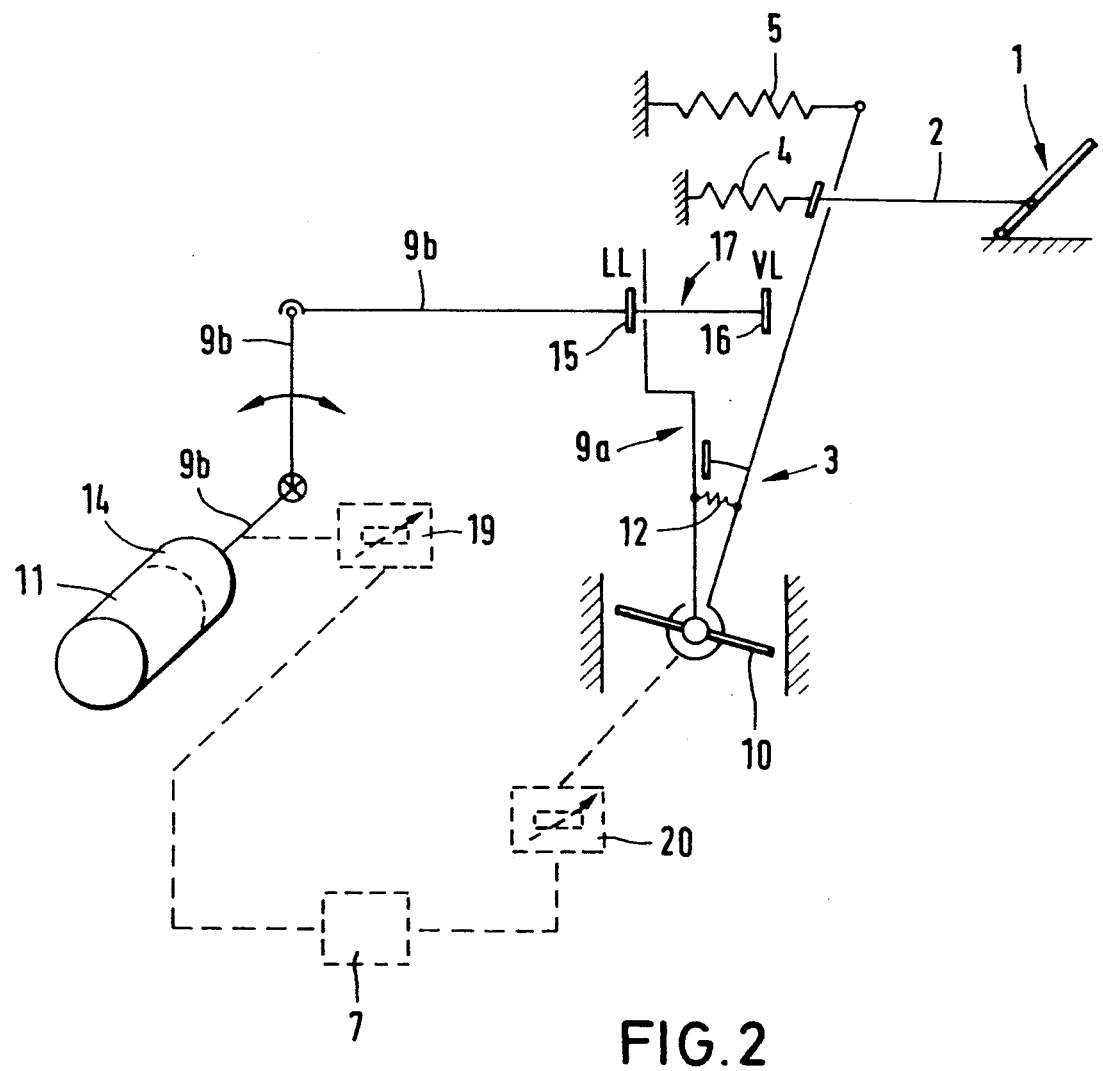
FIG. 2 is a linear showing in accordance with the block diagram of FIG. 1 converted into a structural development shown in simplified form.

FIG. 2 shows the conversion of the linear movement of the structural parts which can be noted from FIG. 1 into the swinging movement of the relevant parts which is primarily employed in practice. Parts agreeing to the parts shown in FIG. 1 are provided with the same reference numerals.

Figure 3:
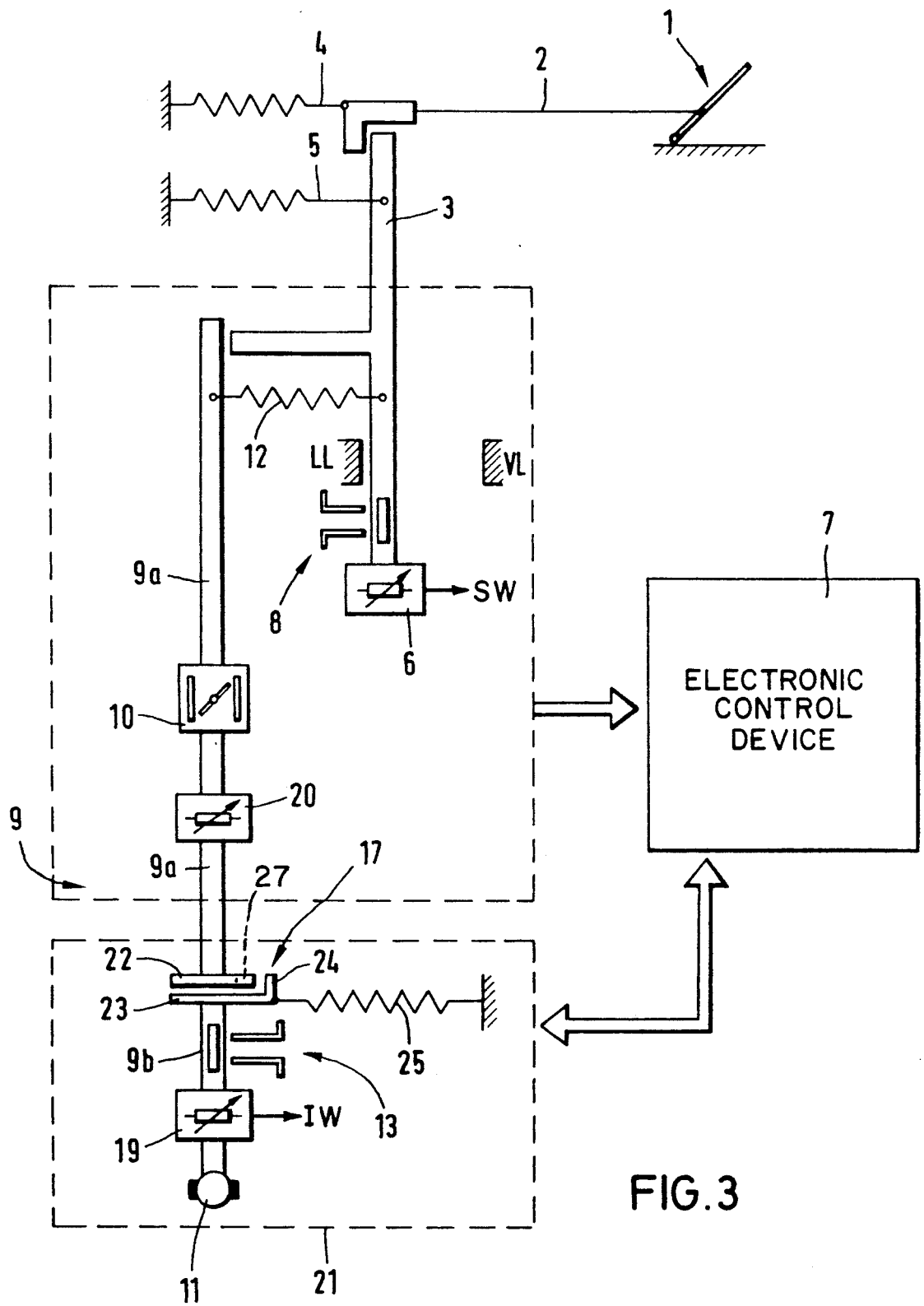
FIG. 3 shows the invention in accordance with a second basic principle, shown on basis of a block diagram in linear showing.

Also in the case of the variant shown in FIG. 3, which is modified as compared with the showing in FIG. 1 only in the region of the idle-path coupling element 17, parts agreeing with the parts shown in that drawing have, for the sake of simplicity, been provided with the same reference numerals. In the embodiment shown in FIG. 3, the clutch 14 which consists, as a general rule, of two ordinary clutch halves which can be connected with each other is dispensed with and, instead of this, the idle-path coupling element 17 has two coupling halves 22 and 23. The coupling half 22 is connected with the setting-member-side control-element part 9a and the coupling half 23 is connected with the setting-drive-side control-element part 9b. Relative movement of the control-element parts 9a and 9b in upward-control direction of the setting member 10 and, thus in full-load direction of the control-element part 9a, is limited by form-locked engagement of a driver 24, connected with the coupling half 23, with the other coupling half 22. The limiting can, for instance, be effected in the manner that the driver 24 passes through a slot 27 in the coupling half 22, and the length of the slot is so selected that, referred to the setting path of the driver, said length is limited only in the said upward control direction and thus by one end of the slot.

The development in principle of the load adjustment device of FIG. 3 proceeds from the basis that the coupling halves 22 and 23 as a rule are open towards each other so that, as a result of the free mobility of the driver relative to the coupling half 22, the setting-member-side control-element part 9a can be moved freely by the accelerator pedal In the case of the anti-slip control, the coupling halves 22 and 23 remain in open position to each other and a downward control of the setting member 10 takes place via the electric setting drive 11 which moves the driver 24 in idle direction against the stop of the coupling half 22.

For speed control, the two coupling halves 22 and 23 are closed, as in the case of the clutch 14 in accordance with the embodiment of FIG. 1, so that a rigid connection results between the two control-element parts 9a and 9b, and the setting member 10 is moved by the electric setting drive 11 in accordance with the predetermined value of the electronic control device 7. Corresponding to the control of the setting member 10 upon anti-slip control, the load adjustment device also permits idle control with the electric setting drive activated and coupling halves 22 and 23 detached from each other.

Figure 4:
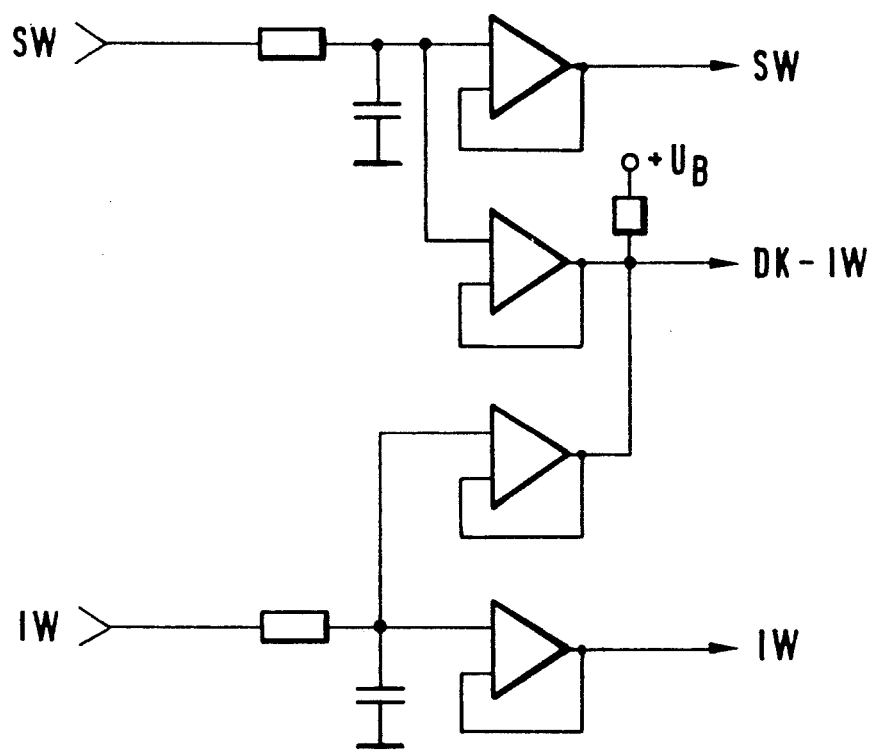
FIG. 4 is a circuit for determining the position of the setting member based on the position of the driver and the position of the setting-drive-side control element.

FIG. 4 shows principles of an electronic circuit, included within the electronic control device 7, which makes it possible to represent the position of the setting-member-side control-element part 9a on a basis of the position of driver 3 and setting-drive-side control-element part 9b, i.e. to dispense with an actual-value detection element 20 which is associated with the setting-member-side control-element part 9a. As input variable, the circuit has the desired value SW represented by the desired-value detection element 6 and the actual value IW represented by the actual-value detection element 19, which values simultaneously also represent output variables. The inputted values SW and IW are checked by the circuit to determine which has the lower value; the lower value is considered the actual value of the throttle valve 10, and is indicated in FIG. 4 by the legend DK-IW.

We claim:

1. A load adjustment device comprising
   a control element, and a setting member which is driven by the control element to determine the output of an internal combustion engine;
   a driver, an accelerator pedal, an electric setting drive, a desired value detection element operatively coupled with the driver, an electronic control device, and an actual value detection element which cooperates with the desired value detection element; and
   wherein the control element is spring-coupled with the driver which is actuatable via the accelerator pedal, the control element being moveable by means of the electric setting drive;
   the actual-value detection element is operatively coupled with the control element and acts on the electric setting drive, the electric setting drive being adapted to be controlled as a function of the detected values by the electronic control device;
   the control element has a first control-element part operatively coupled with the setting member and a second control-element part operatively coupled with the setting drive;

the control element part further comprises an idle-path coupling element, and a stop; and the idle-path coupling element permits relative mobility, limited by the stop at least in one control direction, of the first and the second control-element parts with respect to each other over a partial adjustment range of the control element.

2. A load adjustment device according to claim 1, wherein the relative mobility of said first and said second control elements parts is limited in upward-control and downward-control directions of said setting member.

3. A load adjustment device according to claim 2, wherein the limiting of the relative mobility permits a relative displacement of said first and said second control-element parts with respect to each other within an adjustment range from idle to full load.

4. A load adjustment device according to claim 1, wherein said idle-path coupling element is connected to said second control-element part, and has a first idle stop and a second idle stop in a path of movement of said first control-element part; and the load adjustment device further comprises a spring which urges said second control-element part in the idle direction.

5. A load adjustment device according to claim 1, wherein said second control-element part has a clutch disposed between said setting drive and said idle-path coupling element.

6. A load adjustment device according to claim 1, wherein the relative mobility of said first and said second control-element parts is limited only in the upward-control direction of the setting member.

7. A load adjustment device according to claim 6, wherein said idle-path coupling element comprises a first idle coupling half, a second idle coupling half, and an idle driver extending from said second idle coupling half for engagement with said first idle coupling half; and said first idle coupling half is connected to said first control-element part and said second idle coupling half is connected to said second control-element part; and relative movement of said first and said second control-element parts in the upward-control direction of said setting member is limited by form-locked engagement of said idle driver with said first idle coupling half.

8. A load adjustment device according to claim 7, wherein said first idle coupling half has a slot; and said idle driver passes through said slot.

9. A load adjustment device according to claim 7, wherein said idle-path coupling element comprises an idle spring which urges said second idle coupling half or said second control-element part in a direction of full load.

10. A load adjustment device according to claim 1, wherein said actual-value detection element is operatively coupled with said second control-element part.

11. A load adjustment device according to claim 1, further comprising an additional actual-value detection element which is operatively coupled with said first control-element part.

* * * * *